(No Model.) 3 Sheets—Sheet 1.

R. BUNGEROTH.
MANUFACTURE OF TUBES, &c., AND APPARATUS THEREFOR.

No. 590,130. Patented Sept. 14, 1897.

WITNESSES
Geo. C. Abbe
Louis Wenke

INVENTOR
Rudolf Bungeroth
by his Attorneys
Howson and Howson (No Model.) 3 Sheets—Sheet 2.

R. BUNGEROTH.
MANUFACTURE OF TUBES, &c., AND APPARATUS THEREFOR.

No. 590,130. Patented Sept. 14, 1897.

WITNESSES
Geo. C. Abbe.
Louis Wenke

INVENTOR
Rudolf Bungeroth
by his attorneys
Howson and Howson

UNITED STATES PATENT OFFICE.

RUDOLF BUNGEROTH, OF REMSCHEID, GERMANY, ASSIGNOR TO THE DEUTSCH-OESTERREICHISCHE MANNESMANNRÖHREN-WERKE, OF DUSSELDORF, GERMANY.

MANUFACTURE OF TUBES, &c., AND APPARATUS THEREFOR.

SPECIFICATION forming part of Letters Patent No. 590,130, dated September 14, 1897.

Application filed April 3, 1896. Serial No. 586,074. (No model.)

*To all whom it may concern:*

Be it known that I, RUDOLF BUNGEROTH, engineer, a subject of the German Emperor, residing at Remscheid, Germany, have invented Improvements in the Manufacture of Tubes and other Hollow Bodies and Apparatus Therefor, of which the following is a specification.

This invention relates to improvements in and connected with the manufacture of tubes and other hollow bodies.

According to this invention a heated block or the material to be worked in a plastic condition is introduced into a mold and is then perforated or made hollow by means of a punch or ram and a suitable anvil in such a manner that during the first part of the operation the hole is made when the anvil remains fixed in position, the material being forced to flow into the space between the outside of the punch or ram and the inside of the mold, while toward the end of the operation the ram finishes the tube or forms the hole or perforation in the end of the hollow body by the yielding of the said anvil. The punch or ram is then removed, while the tube or hollow body thus formed remains in position in the mold through friction until it is forced out by suitable means.

The invention is more particularly applicable to the manufacture of tubes from heated blocks of metal, but may also be employed for the manufacture of hollow bodies from cold plastic materials.

To enable the invention to be fully understood, I will describe the same by reference to the accompanying drawings, in which—

Figure 6:
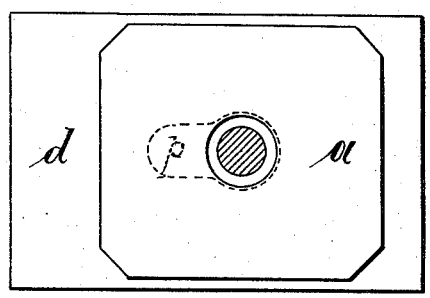
Figure 5:
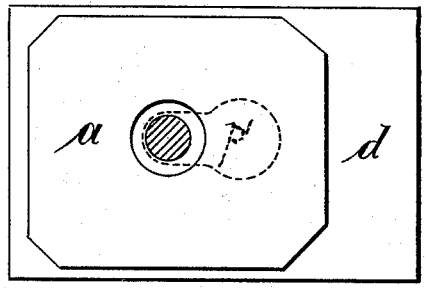
Figure 4:
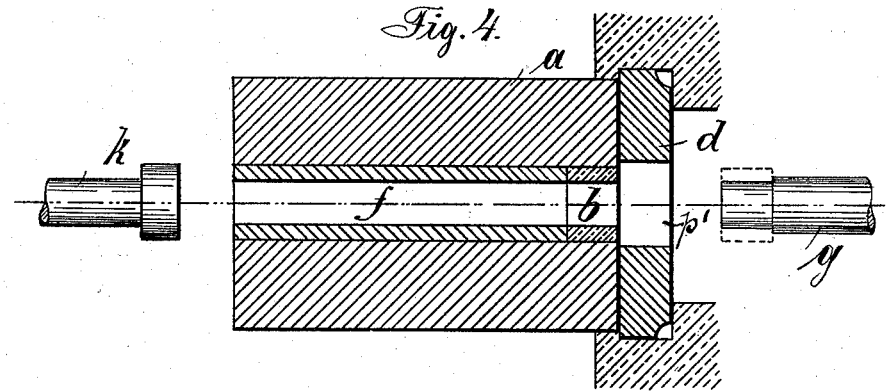
Figure 7:
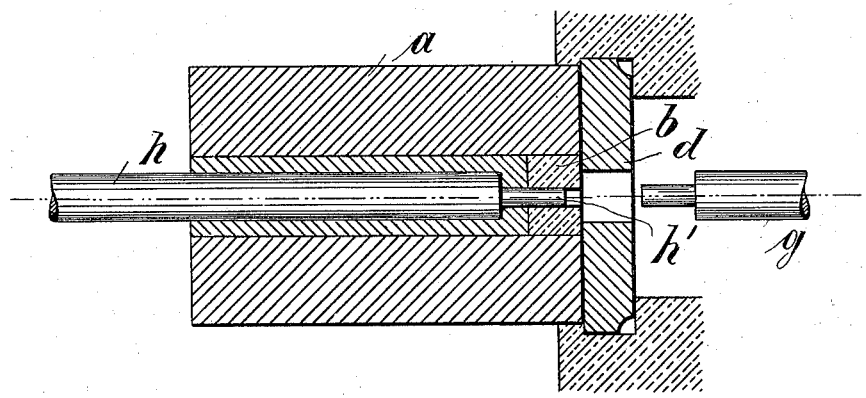
Figure 8:
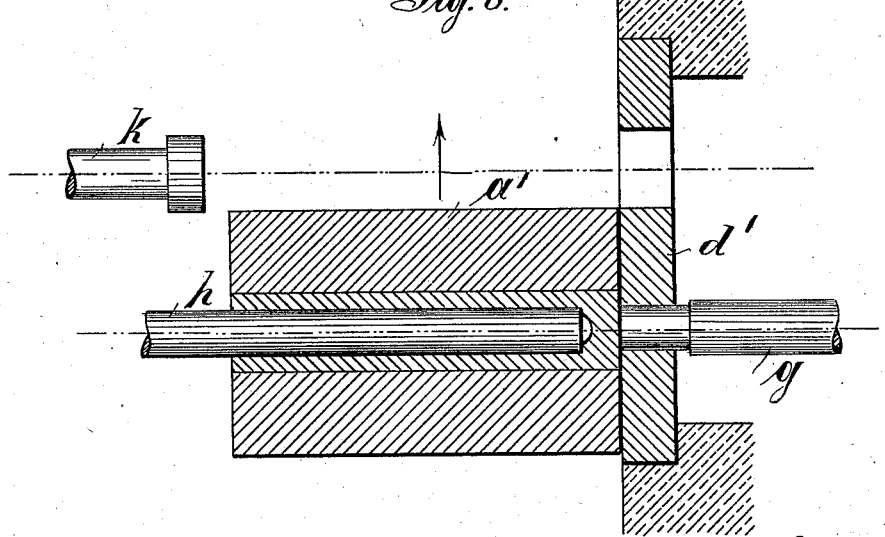

Figures 1, 2, 3, and 4 are sections illustrating various stages in the manufacture of tubes according to my invention. Figs. 5 and 6 show details, and Figs. 7 and 8 are views of two modifications.

Figure 1:
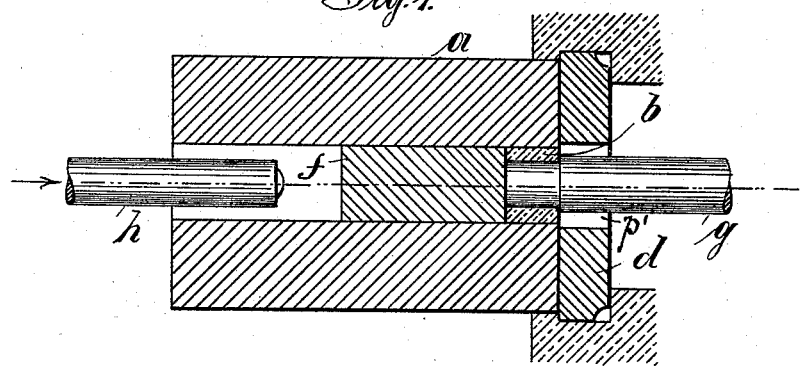

As shown in Fig. 1, the mold is formed of a hollow body $a$, provided in the interior with a collar or ring $b$, the internal diameter of which corresponds to the inside diameter of the tube or the like to be manufactured.

In contact with the ends of the mold $a$ and collar $b$ is a slide $d$, adapted to be suitably moved in the frame of the press.

Figure 2:
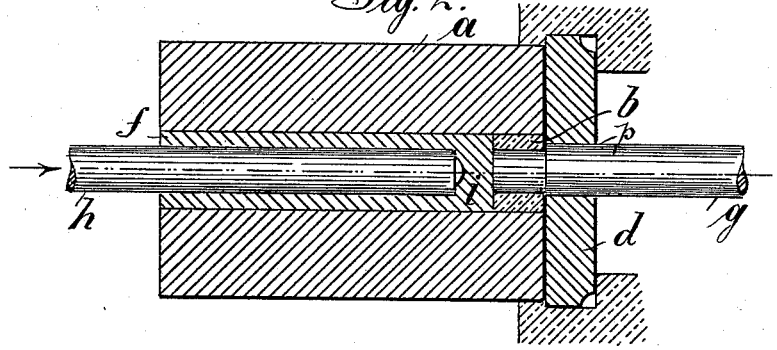

When a block $f$ of material is introduced into the mold $a$, as shown in Fig. 1, the anvil or bar $g$ is passed into the collar or ring $b$ through a hole in the slide $d$, so as to form with the front end of the collar the bottom end of the mold. The ram $h$ is then introduced into the other end of the mold in the direction of the arrow, Fig. 1, and as the anvil or bar $g$ remains fixed in position the movement of the ram into the mold causes a recess or hole to be formed in the block $f$ of material, which flows into and fills the space between the ram $h$ and the mold, as shown in Fig. 2.

Figure 3:
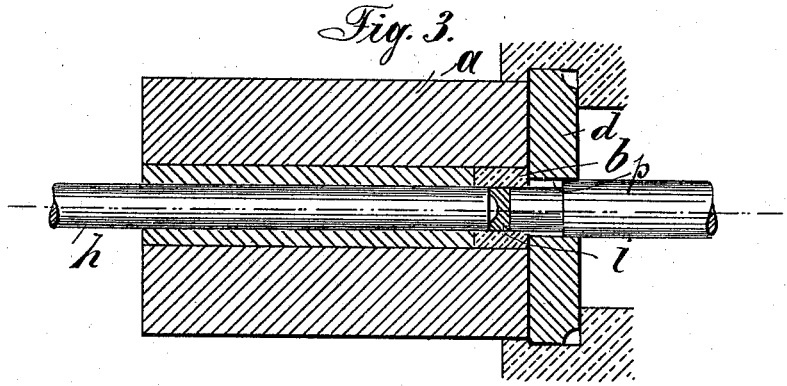

Toward the end of the above operation the portion $i$ of the metal or other material which is left between the ram $h$ and the anvil or bar $g$ is forced out by the ram by then allowing the said anvil or bar $g$ to yield or move backward out of the collar, as shown in Fig. 3. The ram $h$ is then withdrawn from the mold and the finished tube is forced out from the latter by means of the tool $k$, Fig. 4, or by the bar $g$, which for this purpose is fitted with a ring, as shown in dotted lines in Fig. 4, to bring it to the right diameter—*i. e.*, the diameter of the inside of the mold. To allow of the tube being thus forced out of the mold, the position of the slide $d$ is shifted so that the collar $b$ comes opposite a larger hole or opening $p'$ in the same than that, $p$, through which the anvil or bar $g$ is passed during the operation. (See Figs. 5 and 6.)

Figs. 5 and 6 illustrate the two positions of the slide $d$. In Fig. 5 the slide is in the position which it occupies in Figs. 2 and 3, in which the axis of the mold is opposite the smaller hole or opening, thereby permitting the passage of the bar $g$, but not that of the collar $b$.

In Figs. 1 and 6 the opening in the mold is opposite the larger of the two holes or openings, so as to permit of the passage of the collar $b$. In this position of the slide the collar $b$ can be introduced into the mold by means of the bar $g$, provided with its collar, so that when the said slide is shifted from the position shown in Fig. 6 to that shown in Fig. 5 the collar $b$ is held in its operative position.

As shown in Figs. 5 and 6, the two holes or openings $p$ $p'$ in the slide $d$ open into one another, so that the slide can be moved while the anvil or bar $g$ is in its operative position.

For the purpose of manufacturing hollow bodies with a perforated bottom or end the collar $b$ is made of a correspondingly smaller internal diameter, the rod $g$ being also reduced in diameter to the required extent. Fig. 7 illustrates the manufacture of such a perforated tube. The ram $h$ is provided at its end with a pin $h'$ to form the perforation in the bottom or end of the tube.

The above-described apparatus possesses many advantages over existing apparatus for the manufacture of tubes and hollow bodies, among which may be mentioned the following, namely: that the block to be perforated and the collar $b$ can be introduced into the mold by means of the anvil or bar $g$, which when employing heated blocks is of very great importance, as the introduction of the same can be effected in the quickest possible time. If cold material be employed, the arrangement can be simplified by combining the collar $b$ with the slide, as shown in Fig. 8. The slide $d$ is provided in this case with two separate orifices or holes, the diameter of one of which corresponds to the inner diameter of the tube or body to be formed, while the second orifice or hole is of sufficient size either to allow the manufactured tube or hollow body to be forced out of the mold in the above-described manner or to allow the tool $k$ to be passed through the mold.

Instead of, as in the preceding modification, causing the slide $d$ to be movable it may be made fixed, in which case the mold $a'$ must be made movable on the fixed part $d'$, Fig. 8.

It will be obvious that several molds can be combined so as to revolve around a common axis arranged parallel to the axis of the molds, in which case each mold is brought in turn opposite to the holes in the fixed part or body $d$, thereby permitting the manufacture and ejection of hollow bodies or tubes.

I claim as my invention—

1. In an apparatus for making tubes the combination of a mold, and a ram or punch working therein, with means for supporting the rear end of the body to be perforated, a movable anvil having its end of the same diameter as the punch and means for moving and yielding the said anvil according to the perforating force of the punch.

2. In an apparatus for making tubes, the combination of a mold, and a ram or punch working therein with a collar for supporting the rear end of the body to be perforated, means for supporting the said collar, a movable anvil having its end of the same diameter as the punch fitting in the collar, and means for moving and yielding the said anvil according to the perforating force of the punch.

3. In an apparatus for making tubes the combination of a mold, and a ram or punch working therein with a collar for supporting the rear end of the body to be perforated, a slide for supporting the collar having two holes of different diameters opening into each other, a movable anvil having its end of the same diameter as the punch fitting in the said collar and means for moving and yielding the said anvil according to the perforating force of the punch.

In testimony whereof I have signed my name to this specification in the presence of two subscribing witnesses.

RUDOLF BUNGEROTH.

Witnesses:
WILLIAM ESSENWEIN,
EMMA LIEBER.